United States Patent [19]

van der Scheer

[11] 4,354,215
[45] Oct. 12, 1982

[54] SELECTIVE SAFETY DEVICE FOR THE PROTECTION OF A POWER DISTRIBUTION SYSTEM

[75] Inventor: Derk van der Scheer, Goor, Netherlands

[73] Assignee: Hazemeijer B.V., Hengelo, Netherlands

[21] Appl. No.: 158,618

[22] Filed: Jun. 11, 1980

[30] Foreign Application Priority Data

Jun. 11, 1979 [NL] Netherlands .................. 7904563

[51] Int. Cl.³ ........................................... H02H 3/00
[52] U.S. Cl. ........................................ 361/63; 361/62
[58] Field of Search ................... 361/62, 58, 63, 67

[56] References Cited

U.S. PATENT DOCUMENTS

| | | | |
|---|---|---|---|
| 3,152,284 | 10/1964 | Pulsford | 361/67 |
| 3,873,887 | 3/1975 | Barkan et al. | 361/63 X |
| 4,070,641 | 1/1978 | Khalid . | |

FOREIGN PATENT DOCUMENTS

| | | | |
|---|---|---|---|
| 609528 | 5/1956 | Fed. Rep. of Germany | 361/62 |
| 1070281 | 12/1959 | Fed. Rep. of Germany . | |
| 1141012 | 12/1962 | Fed. Rep. of Germany . | |
| 2008086 | 10/1970 | Fed. Rep. of Germany . | |
| 2321179 | 3/1977 | France . | |
| 7608512 | 7/1976 | Netherlands . | |

OTHER PUBLICATIONS

Publication "Betriebs-Technik 1966", by Arno Treptow, Heft 10, Strombegrenzende Kurzschlussausschaltungen in Niederspannungsverteilungen.

Primary Examiner—Reinhard J. Eisenzopf
Attorney, Agent, or Firm—Watson, Cole, Grinde & Watson

[57] ABSTRACT

In a selective safety device for the protection of successive power levels in a power distribution system, a current limiting switch is provided in each of the power levels and includes a current-limiting quick-switching contact which is so positioned at the power supply side in each one of the different power levels such that the current limiting switch immediately in front of a fault is switched off upon occurrence of a fault. A resistor is connected across each of the quick-switching contacts and is serially connected in the interrupted circuit upon the opening action of the quick-switching contact. Additionally, a slow-switching contact is serially connected with each of the quick-switching contacts to be opened after opening of the quick-switching contact with a presettable delay time, which is dependent upon the power levels in which the slow-switching contact is connected. The resistor across the quick-switching contacts includes at least two serially connected resistance conductors which are gradually introduced in the interrupted circuit by the arc formed between the resistance conductors upon opening of an associated quick-opening switching contact.

6 Claims, 3 Drawing Figures

SELECTIVE SAFETY DEVICE FOR THE PROTECTION OF A POWER DISTRIBUTION SYSTEM

This invention relates to a selective safety device for the protection of a power distribution system, which safety device can be connected between mains sections having a different power level and which succeed each other from the power supply side, said device being provided with a current limiting switch having a current limiting quick switching contact, with which in case of a fault in a mains section of the power distribution system only the current limiting switch positioned at the power supply side immediately in front of said fault will permanently switch off the relative mains section.

With the increase in power densities of distribution systems the short-circuit power capacity of the distribution network increases as well. In order to be able to control the increase in short-circuit power capacity one is continuously striving to raise the interruption capacity of the current breakers.

Although in the case of safety fuses one has successfully managed to guarantee the interruption capacity, even in the very high current range, as well as the selectivity, safety fuses have various disadvantages. i.e. The heat dissipation under normal conditions is comparatively high, so that in the case of nominal currents higher than 1,000 amperes preferably no safety fuses are used. In addition, there are the known disadvantages, such as the necessity of replacement after interruption of a cartridge fuse and fuse-ageing, as a consequence of which the interruption characteristics will change. Moreover, a safety fuse cannot be used in combination with other functions, such as remote control, earth-leakage protection and zero-voltage protection.

When a conventional switch is used instead of a safety fuse, the aforementioned disadvantages will not show, but the switch will have to be dimensioned heavier and more complicated in order to control the increased dynamic and thermal load resulting from a short-circuit current.

A current limiting quick-switching contact may then be a solution because this contact will prevent full short-circuit current by opening the contacts already in the first quarter cycle of the alternating current, so that the short-circuit current is limited and the contact may be of a less heavy construction.

However, if a power distribution system is to be selectively protected exclusively with the aid of these current limiting quick-switching contacts, it is not possible to delay the operation of the current limiting switches with respect to each other, said switches being provided in a distribution system of this kind at different energy levels, i.e. at different distances to the power supply point, because of the fast reaction times of said current limiting contacts.

The German Offenlegungsschrift No. 2,525,192 discloses a system with which the above-mentioned problem is solved. To that end, each current limiting quick switching contact is provided with a counter which counts the successive opening and closing cycles of the contact of the appertaining current limiting switch. Depending on its level in the distribution system, said counter can be set for a definite number of opening and closing cycles. When the number of opening and closing cycles, for which the counter has been set, has been reached by the current limiting switch, the counter will permanently switch off the relative current limiting switch.

In order to achieve a certain selectivity, the counters are adjusted in such a way that the current limiting switch positioned furthest from the power supply point in the distribution system, i.e. the switch at the lowest energy level, has the smallest number of opening and closing cycles before the final switch off is effected and the current limiting switch positioned nearest to the power supply point, i.e. the switch at the highest energy level, has the largest number of opening and closing cycles. However, this implies that in the event of a fault near the power supply point the current limiting switch which should switch off the fault current will first switch in a few times upon the fault current or short circuit current itself. It is apparent that the reclosing actions upon a fault current are a considerable drawback when using this system. Moreover, the inclusion of a comparatively complicated and, therefore, expensive counter in all current limiting switches increases the price of the entire device, which makes it uncompetitive.

It is the object of the present invention to provide a selective safety device of the type mentioned in the preamble, in which current limiting quick-switching contacts are used and in which the aforementioned disadvantages are avoided. To that end, the selective safety device is characterized in that a resistor is connected across the quick switching contact of the current limiting switch, said resistor being serially connected in the interrupted circuit upon the opening action of the quick-switching contact, in which the quick-switching contact and the resistor connected across said contact are serially connected with a slowly switching contact, said slowly switching contact being coupled with said quick-switching contact and opens after opening of the quick-switching contact at a delay time which can be preset and which depends on the level at which said slowly switching contact is connected in the power distribution system, said delay time being reset upon reclosing immediately in the initial condition by the current limiting quick-switch contact, said resistor being constituted by at least two serially connected resistance conductors which are connected in parallel across the quick-switching contact and which are gradually serially introduced in the interrupted circuit by the arc which is formed between the resistance conductors upon opening of the quick-switching contact.

Since in the case of the safety device in accordance with the invention the fault current is commutated to one or more parallel resistors upon the opening action of the current limiting quick switching contact, it is primarily achieved that the fault current is limited to an acceptable value. In addition, it is achieved that in acting together with the series-connected, slowly switching contact the limited fault current will be maintained to flow in the distribution system, as a result of which the current limiting quick-switching contacts remain open and will not switch in any longer upon the same fault current. It is then finally possible to switch off selectively the limited fault current with the aid of the slowly switching contact by graded delay times at which the slowly switching contact opens after the current limiting quick-switching contact.

In order to prevent the slowly switching contacts of the current limiting switch, connected between the switched off current limiting switch and the power supply, from switching off even after the set time and after the fault current has been switched off, the current limiting switches in accordance with the invention are provided with locking means between the current limiting quick-switching contact and the slowly switching contact so that upon the closing action of the current limiting quick-switching contact after a switched off fault current the overall delay time of the appertaining slowly switching contact is reset in the initial position. For the delay times between the current limiting quick-switching contacts and the slowly switching contacts, as well as for the resetting of said delay times after the switching off of the fault current, a known mechanical or electromagnetic device can be used.

According to the present invention the resistor across the quick-switching contact of the current limiting switch is constituted by at least two serially connected resistance conductors which are shunted across the quick-switching contact and which are gradually serially connected in the interrupted circuit by the arc which is formed between the resistance conductors upon the opening action of the quick-switching contact.

In a power distribution system which is provided with several selective safety devices in accordance with the present invention, the delay time of the slowly switching contact is preferably shorter insofar as the safety device (including the slowly switching contact) forms part of a mains section lying further away from the power supply point.

In addition, the resistance value of the resistor which is connected across the quick-switching contact of the current limiting switch is higher insofar as the safety device (including the resistor and the quick-switching contact) forms part of a mains section lying further away from the power supply point.

In the above case the resistance values in the various safety devices can be selected such that a selective voltage protection is obtained. When a short-circuit current occurs, a sufficiently high operative voltage level can be maintained at the power supply side of said resistors.

It is observed that from French Pat. No. 1,351,249 a device is known, which also comprises a series-connection of two contacts with a parallel resistor across one of the contacts. Although said French Patent shows a close resemblance to the selective safety device of the present invention, there are essential differences so that said known device cannot be used for the selective protection of a power distribution system.

First of all, the purpose of the known connection is primarily to switch off a short-circuit current with the aid of a smallest possibly dimensioned switch. To that purpose, the contact protecting against a short-circuit current is serially connected with a contact which protects against an overcurrent. Inasmuch as the last mentioned contact needs more time to react upon a fault current, the delay time is used finally to switch off the short-circuit current. In order to protect the contact protecting against an overcurrent against the high short-circuit current, said current is limited with the aid of a parallel resistor. Thus, in case of the known system, the delay time between both contacts arises from the operation of the contact protecting against an overcurrent and is completely determined by the current flowing through said contact. In addition, the delay time can only be influenced by varying the value of the parallel resistor and the load constituted by said resistor. Moreover, an optimal performance of the known device requires the use of a parallel resistor having a high positive temperature coefficient. It is herewith achieved that on the one hand the transfer of current by the resistor in the case of a short-circuit gives hardly any trouble and, on the other hand, the short-circuit current is sufficiently limited.

In the known device, the choice of the maximum end value to be reached of the nonlinear resistor is also determined by the cooperation with the overcurrent protection. For if one chose a low maximum value for the resistor, in the case of high short-circuit currents the passed $i^2t$ value may be so high that the overcurrent protection is destroyed. If, on the other hand, a high maximum value is chosen, there is the risk that due to the long switch-off time of the overcurrent protection the nonlinear resistor will burn, even in the case of said considerably limited short-circuit current.

Even when the resistance value of the known device is chosen such that the above-mentioned possibilities do not occur, when a number of such known devices are serially connected in a power distribution system, the short-circuit current will be limited such by the resistors also serially connected, that the final interruption will be delayed by the contact of the overload protection as a consequence of which the risk of burning of the resistors has become real. In the case of the safety device in accordance with the present invention the adjustable time delay with which the slowly switching contact opens after the current limited quick-switching contacts, is independent of the current value across said slowly switching contact. Consequently, the time delay can be set for such a short period of time (a few dozen seconds) that burning of the resistors is impossible.

It is also possible to give the slowly switching contact of the selective safety device in accordance with the invention other protection functions, such as the function of overcurrent protection or earth-fault protection, in which the safety device is also protected in the manner described above against damage by currents which are too high and/or flow too long. To that end, the slowly switching contact may also be provided with means with which it can be switched in and out manually and/or electromagnetically.

The invention will now be described more detailed with reference to the drawing, wherein.

Figure 1:
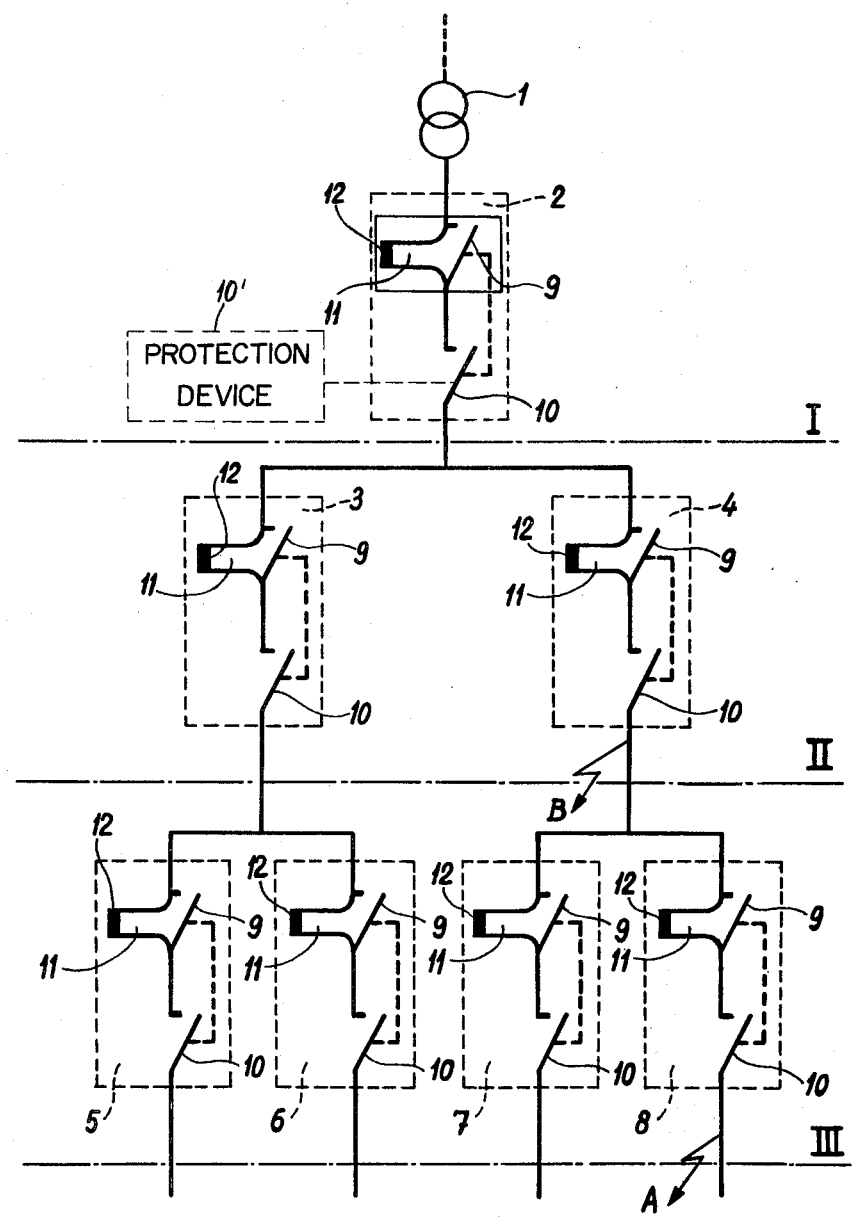
FIG. 1 is a schematic diagram illustrating a power distribution system comprising selective safety devices in accordance with the present invention.

FIG. 1 is a schematic diagram illustrating a power distribution system which is being fed at the power supply point by a voltage source, e.g. a transformer 1. The power distribution system of FIG. 1 is as an example divided into three energy levels I, II and III lying at different distances to the source, and each level is fed via one or more selective protection systems 2-8. Level I is fed via the selective protection system 2, level II is fed via the selective protection systems 3 and 4 and level III is fed via the selective protection systems 5-8. Each protection system comprises a limiting device 9 and a slowly switching contact 10. The limiting device 9 includes a current limiting switch having a quick-switching contact 11 and a current limiting parallel resistor 12.

The slowly switching contacts 10 are coupled with the current limiting quick-switching contacts 11 in such a way that when a current limiting quick switching contact opens, the belonging slowly switching contact 10 will open as well after a certain preset delay time. Thus, for level III the contacts 10 of the selective protection systems 5–8 can be set without a delay; for level II the contacts of the selective protection systems 3 and 4 can be set with a delay of 10 msec., and the contact of the selective protection system 2 for level I can be set with a delay of 20 msec. for instance, so that a graded time of 10 msec. arises between the various levels. Depending on the demands in a specific case, however, said graded delay time can be varied.

If, e.g. a short-circuit occurs in point A and the short-circuit current is sufficiently high, the quick-switching contacts 11 of the selective protection systems 2, 4 and 8 will open immediately and, in doing so, they will also commutate the short-circuit current to the parallel resistors 12 so that the short-circuit current is limited. Because the short-circuit develops in point A at level III, in this case the slowly switching contact 10 of the selective protection system 8 will almost simultaneously switch off the short-circuit current completely, whereupon the quick-switching contacts 11 of the selective protection systems 2 and 4 will be switched in again and herewith reset the delay times of the appertaining slowly switching contacts for another short-circuit, if that should occur.

In some cases it is possible to provide the selective protection systems 5–8 for the last level only with a quick-switching contact 11, because selectivity with respect to a lower level will then not be required. If necessary, the current limiting parallel resistor 12 can be replaced by an arc-extinguishing compartment.

Let us suppose that a short-circuit occurs in point B of level II. The quick-switching contacts 11 of the selective protection systems 2 and 4 will be opened immediately when the short-circuit current is sufficiently high, and the short-circuit current is limited again by the parallel resistors 12. After the set delay time, in this example 10 msec., the slowly switching contact 10 of the selective protection system 4 will permanently switch off the short-circuit current and upon the reclosing of the quick-switching contact 11 of the selective protection system 2 the current supply for the remaining section of the power distribution system will be continued uninterruptedly.

It is evident from the aforegoing that in the case of the selective current limiting device in accordance with the invention each short-circuit current can permanently be switched off selectively, i.e. only by means of the switch which is mounted right above said short-circuit as seen in FIG. 1.

In the present invention there is considerable freedom with respect to the choice of the value of each parallel resistor 12 because in the selective current limiting device these parallel resistors 12 are shunted across the quick-switching contacts and comprise at least one pair of resistance conductors, and also are gradually serially introduced in the circuit of the short-circuit current by means of the arc formed upon opening the quick-switching contacts 11. The particular advantage hereof is, that the selective current limiting systems can also be used to make a power distribution system voltage-selective under short-circuit conditions. By voltage-selectivity is meant that outside the section of the power distribution system, being switched off as a result of a short-circuit, there will never be a voltage drop of e.g. more than 25–35%. Voltage-selectivity prevents apparatus from failing in the section of the distribution system which is not switched off after a short-circuit when the voltage drops below a predetermined value. The parallel resistor 12 of the selective protection system 2 may have a value of e.g. 10 mohm, the parallel resistor 12 of the selective protection systems 3 and 4 may have a value of 30 mohm, and the parallel resistor 12 of the selective protection systems 5–8 may have a value of 80 mohm.

In the case of a short-circuit in point A there will be a voltage at level II of $$\frac{80}{10 + 30 + 80} \times 100\% = 67\%$$

of the nominal voltage. If a short-circuit occurs in point B the prevailing voltage will even amount to $$\frac{30}{10 + 30} \times 100\% = 75\%$$

of the nominal voltage.

Figure 2:
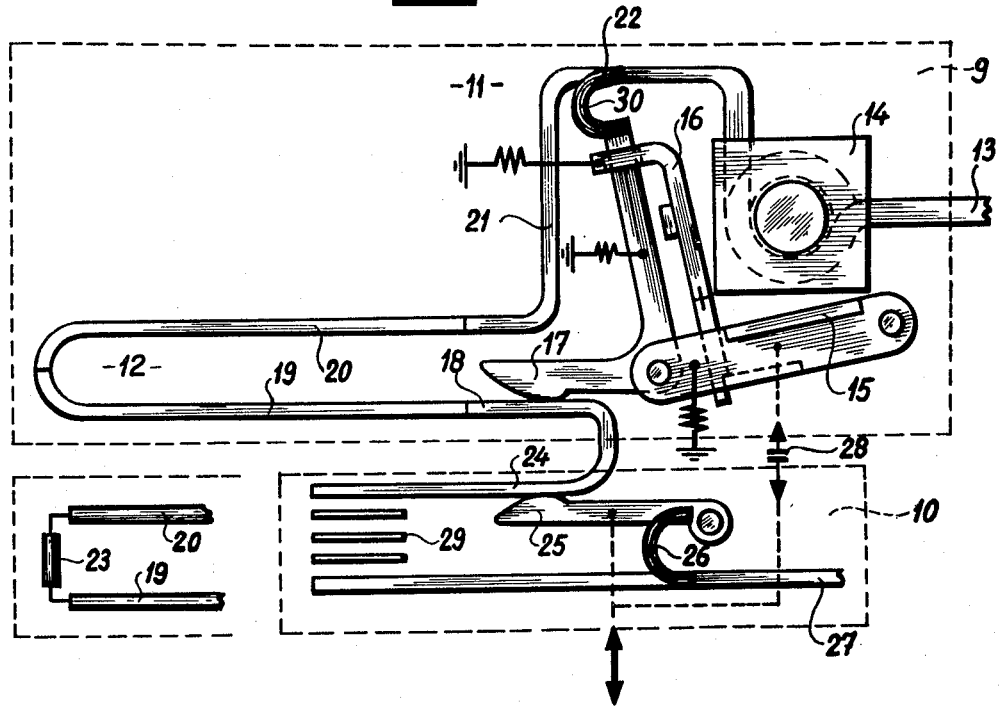
FIG. 2 is a possible embodiment of a selective safety device in accordance with the invention.

FIG. 2 illustrates a possible embodiment of a selective safety device in accordance with the present invention. This embodiment can be divided into two main components, i.e. a limiting device 9 and a slowly switching contact 10. These two main components are surrounded by dotted lines. The limiting device 9 can be subdivided into a current limiting quick-switching contact 11 and a current limiting resistor section 12.

The current limiting quick-switching contact 11 can be of any suitable type but preferably of the type described in Dutch patent application No. 7903987.

For a complete description of the current limiting quick-switching contact 11 it is referred to the above-mentioned application. The current limiting quick-switching contact 11 is provided with a current limiting resistor section 12 connected in parallel thereto, as described in Dutch patent application No. 7608512.

A slowly switching contact 10 is serially connected with the limiting device 9, said contact can also be used as the contact of a protection device 10, such as an overcurrent protection, an earth-fault protection, etc. However, it can also be provided with manually operated means and/or electromagnetically operated means.

In the case of a short-circuit in the power distribution system the selective safety device in accordance with the invention operates as follows. The short-circuit current flows from the current connection point 13 through the coil of an electromagnet 14 and energizes the armatures 15 and 16 for the driving and the release of the moving contact 17 of the current limiting quick-switching contact 11.

The stationary contact of the current limiting quick-switching contact 11 is formed by the one end portion 18 of the resistance conductor 19 of the current limiting resistor portion 12. When as a consequence of a short-circuit current, the moving contact 17 is moved away from the end portion 18, an arc will be formed which, under the influence of the magnetic field produced by the current flowing through the moving contact 17 and the end portion 18, will run off via the resistance conductor 19 of the contact point and at a given moment said arc will jump over from the moving contact 17 to a second resistance conductor 20 of the current limiting resistor portion 12.

Both resistance conductors 19 and 20 run parallel in space and at the end facing away from the contact point they may directly or indirectly be connected to each other via a resistor 23 (see inset). In the first case, both resistance conductors 19 and 20 have a certain total resistance value so that the requisite limitation of current is achieved. In the second case, the outer ends of both resistance conductors 19 and 20 are connected to a resistor 23, in which the total resistance value gives again the requisite limitation of current. This procedure is applied when the resistance value should be so high that it cannot or can hardly be achieved with only the two resistance conductors 19 and 20.

In both cases a certain requisite resistance value will finally be included in the circuit of the short-circuit current. To that end, the resistance conductor 20 is connected at the end facing the contact point to a portion 21 with which the resistance conductor 20 is electrically connected to the connection point 22 of the moving contact 17, so that the short-circuit current flows through a circuit which is successively formed by the current connection point 13, the windings of the electromagnet 14, the current connection point 22, the electrically conductive portion 21, the resistance conductors 20 and 19, (or the resistance conductor 20, the resistor 23, the resistance conductor 19), and the end portion 18. Said end portion is in current conducting connection with the stationary contact 24 of the slowly switching contact 10.

The moving contact 25 cooperates with the stationary contact 24, said moving contact communicating with the current connection point 27 via a flexible connection 26, so that the circuit for the limited short-circuit current is constituted by end portion 18, stationary contact 24, moving contact 25, flexible connection 26 and current connection point 27.

The moving contact 25 of the slowly switching contact 10 and the moving contact 17 of the current limiting quick-switching contact 11 are connected to each other via a coupling 28. Said coupling takes care that the slowly switching contact 10 will be opened with a certain delay after the current limiting quick-switching contact 11 and that the delay time of the slowly switching contact 10 is reset in the initial condition when the current limiting quick-switching contact 11 is switched in again. The coupling 28 of FIG. 2 is only schematically illustrated with a broken line and can be embodied in many ways. An example of a feasible embodiment is discussed hereafter with reference to FIG. 3.

When the set delay time has passed, the moving contact 25 of the slowly switching contact 10 will be moved away from the fixed contact 24 and the short-circuit current is permanently interrupted. The arc which was formed during the disconnection of the moving contact will be extinguished in a known manner with the aid of an extinguishing compartment 29.

Under normal, undisturbed conditions the current 1 flows through the current connection point 13, the energizing windings of the electromagnet 14, the current connection point 22, the flexible connection 30, the moving contact 17, the end portion 18, the stationary contact 24, the moving contact 25, the flexible connection 26 and, finally, through the current connection point 27. When the slowly switching contact 10 is also used as the contact of a safety device, such as an overcurrent relay or an earth-fault relay, the power distribution system is also protected against an overcurrent and/or an earth fault and fault currents which remain below the set threshold value of the current limiting quick-switching contact 11 are switched off by the safety device (including the slowly switching contact 10).

Figure 3:
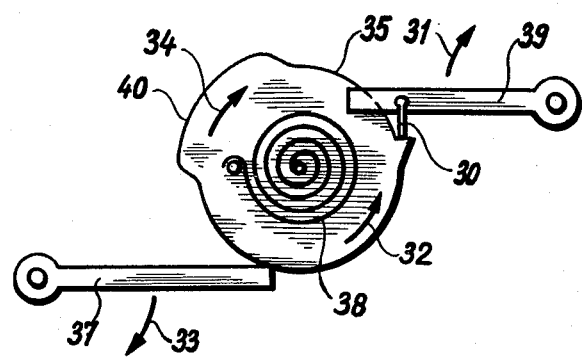
FIG. 3 illustrates an embodiment of a mechanical coupling to be used in the device of FIG. 2.

FIG. 3 is a schematic drawing, illustrating a possible embodiment of the coupling 28 of FIG. 2. The coupling comprises a cam disk 35 which is pre-stressed by a spring 38 in the direction of rotation indicated by arrow 32. The cam disk 35 cooperates with two pawls, i.e. locking pawl 30, 39 of the quick-switching contact and locking pawl 37 of the slowly switching contact.

When the quick-switching contact opens, the locking means of the quick-switching contact will move in the direction of arrow 31, as a result of which the locking pawl 30, 39 releases the cam disk 35. Under the influence of the driving spring 38, the cam disk 35 will move in the direction indicated by arrow 32. Depending on the pre-stress of spring 38 the cam disk will be accelerated more quickly or more slowly and the cam portion 40 will reach the locking pawl 37 of the slowly switching contact sooner or later and finally force the slowly switching contact to be switched off in the direction of arrow 33.

When the pre-stress of the driving spring 38 is set and the cam 40 is positioned on the cam disk 35, the delay time can be set.

When the quick-switching contact is reclosed a motor can be started with the aid of a microswitch or the like, said motor moving the cam disk 35 in the direction of arrow 34, and, thus, tensioning the driving spring 38, so that, finally, the initial condition is obtained again.

It is evident that the invention is not limited to the present embodiment but that modifications may be made without departing from the spirit of the invention and the scope of the claims appended hereto.

I claim:
1. A selective safety device for the protection of successive power levels in a power distribution system, comprising:
  a current limiting switch in each of said power levels and including a current limiting quick-switching contact, said current limiting switch being positioned at the power supply side in each one of said different power levels and that current limiting switch immediately in front of a fault being switched off upon occurrence of a fault;
  a resistor connected across each of said quick-switching contacts and being serially connected in the interrupted circuit upon the opening action of said quick-switching contact;
  a slow-switching contact serially connected with each of said quick-switching contacts and being coupled with said quick-switching contact to be opened after opening of the quick-switching contact with a presettable delay time, said delay time being dependent upon the power level in which said slow-switching contact is connected;
  delay time means for establishing said delay time and being immediately reset in an initial condition upon re-closing of the current limiting quick-switching contact;
  said resistor including at least two serially connected resistance conductors connected in parallel across said quick-switching contact and which are gradually introduced in the interrupted circuit by the arc formed between the resistance conductors upon opening of a quick-opening switching contact.

2. A selective safety device as claimed in claim 1 wherein at least one of said slow-switching contacts is coupled with one or more protection devices and can be operated by such devices.

3. A selective safety device as claimed in claim 1 wherein said slow-switching contact is adapted to be manually or electromagnetically operated.

4. A selective safety device as claimed in claim 1 wherein the delay time of each of said slow-switching contacts is shorter the greater the distance said slow-switching contact is positioned away from the power supply mains of said power distribution system.

5. A selective safety device as claimed in claim 1 or 4 wherein the resistance of the resistor is greater across those quick-switching contacts positioned more remotely from the power supply mains of said power distribution system.

6. A selective safety device as claimed in claim 5 wherein the resistance of the resistors in the different power levels is selected to provide selective voltage protection.

* * * * *